United States Patent

Hettich et al.

[11] Patent Number: 5,140,851
[45] Date of Patent: Aug. 25, 1992

[54] CIRCUIT ARRANGEMENT FOR MONITORING PRESSURE AND TEMPERATURE OF TIRES

[75] Inventors: Gerhard Hettich, Dietenhofen; Reiner Dörfler, Nuremberg, both of Fed. Rep. of Germany

[73] Assignee: Robert Bosch GmbH, Stuttgart, Fed. Rep. of Germany

[21] Appl. No.: 477,973

[22] PCT Filed: Aug. 1, 1989

[86] PCT No.: PCT/DE89/00501

§ 371 Date: May 17, 1990

§ 102(e) Date: May 17, 1990

[87] PCT Pub. No.: WO90/03895

PCT Pub. Date: Apr. 19, 1990

[30] Foreign Application Priority Data

Oct. 15, 1988 [DE] Fed. Rep. of Germany ....... 3835236

[51] Int. Cl.$^5$ .................. B60C 23/02; G01L 19/04
[52] U.S. Cl. .................. 73/146.5; 73/708; 340/448; 374/143
[58] Field of Search .......... 73/146.5, 146, 708, 73/146.8; 340/442, 448, 444; 374/143

[56] References Cited

U.S. PATENT DOCUMENTS 4,703,650  11/1987  Dosjoub et al. .......... 73/146.5
4,909,074   3/1990  Gerresheim et al. ...... 73/146.5

*Primary Examiner*—Donald O. Woodiel
*Attorney, Agent, or Firm*—Michael J. Striker

[57] ABSTRACT

A circuit arrangement is suggested for monitoring the air volume in vehicle tires which effects the most accurate possible correction of the temperature measured by a sensor fastened at the wheel to the actual air temperature in the tire. For this purpose, the temperature and pressure measurement value of the tire measured by the rotating sensor (13) of the wheel to be monitored is fed to a correction circuit (18) which is also receives a plurality of correction parameters (p, F, K, v). A corrected value for the temperature ($t_k$) or for the air pressure in the tire is transmitted at the output of the correction circuit (18) as a function of the correction parameters (FIG. 1).

7 Claims, 1 Drawing Sheet

5,140,851

CIRCUIT ARRANGEMENT FOR MONITORING PRESSURE AND TEMPERATURE OF TIRES

BACKGROUND OF THE INVENTION

The invention relates to on a circuit arrangement for monitoring the air volume in a vehicle tire and comprising pressure and temperature rotating sensors fastened at a vehicle wheel, and a transmitter for transmitting sensed values to an evaluating circuit. In order to monitor the air volume in the tire of a motor vehicle in a known circuit arrangement of this type, according to WO 87/041 23, the temperature and pressure of the air in the tire is sensed by semiconductor sensors and corresponding measurement values are transmitted cyclically via a multiplexing control from the rotating wheel via a converter to an evaluating circuit which is fixed with respect to the vehicle. The air volume with which the tire is filled, is determined from the ratio of tire pressure and tire air temperature (PT) and is compared with an allowable limiting value. As soon as the air volume in one of the vehicle tires reaches or falls below the predetermined limiting value, an optical or acoustic signal is issued, and the driver of the vehicle is accordingly alerted to the risk of overstressing the tire.

In order to monitor the air volume in the vehicle tire, it is necessary that the pressure and the temperature of the air in the tire be known as exactly as possible. However, since the air in the tire and the wheel rim can have different temperatures when driving and, since the temperature sensor is inserted in the wheel rim and can therefore be thermally uncoupled from the wheel rim only incompletely, the air temperature in the tire can not be measured with the required accuracy. There is always a temperature difference between the tire air and the measurement value of the temperature sensor.

SUMMARY OF THE INVENTION

The object of invention is to compensate for the temperature measurement error when determining the tire air temperature and air volume in the tire.

The object of the invention is achieved by providing a correction circuit which outputs a measurement value in accordance with appropriate correction parameters.

The circuit arrangement, according to the invention has the advantage that the measurement error of the temperature sensor in the vehicle wheel need no longer be kept as small as possible by costly steps of thermal uncoupling from the wheel rim, rather the parameters producing the measurement value error are now detected in a correction circuit in order that the temperature measurement value or the air volume in the tire calculated from the latter together with the air pressure is corrected as accurately as possible to the actual value independently of these parameters. Another advantage consists in that the correction parameters required for this are, in many cases, already present in the vehicle and are to be determined once for certain vehicle types and/or vehicle wheels, so that the parameters can be fed to the correction circuit without considerable added expenditure. Moreover, costly constructions for the thermal uncoupling of the temperature sensor from the rim temperature can be avoided, since the tire air temperature during driving can be determined with favorable accuracy by the correction parameters, so that the reliability of the monitoring system is considerably increased.

It is particularly advantageous that the correction circuit be integrated in the centrally arranged evaluating circuit, which is fixed with respect to the vehicle, and that variable parameters as well as fixed parameters be fed to the correction circuit. The tire pressure and a signal concerning the state of the roadway, wet or dry, and a driving or speed signal are provided as variable correction parameters. The signal for a wet or dry tire is preferably provided by a moisture sensor of the correction circuit, which moisture sensor is fastened in the area of the wheel of the vehicle and is sprayed by the tire on wet roadways. However, this signal can also be tapped in the simplest manner from the windshield wiper system of the vehicle. The driving signal can be tapped from the speedometer. Correction values and time constants for plotting the temperature during changes in the measurement value are to be provided as fixed correction parameters, the correction values and time constants being determined once according to the vehicle type or the wheels, which are mounted as standard, or the tire equipment and then inputted into a data storage of the correction circuit as fixed values. Finally, the air volume in the tires which is to be monitored is calculated with the tire pressure measurement values which are transmitted continuously to the evaluating circuit. Moreover, a warning signal can be triggered at extremely low air pressure, e.g. during a faulty temperature measurement.

The present invention both as to its construction so to its method of operation, together with additional objects and advantages thereof, will be best understood from the following detailed description of specific embodiments when read in connection with the accompanying drawings.

DESCRIPTION OF THE PREFERRED EMBODIMENT

Figure 1:
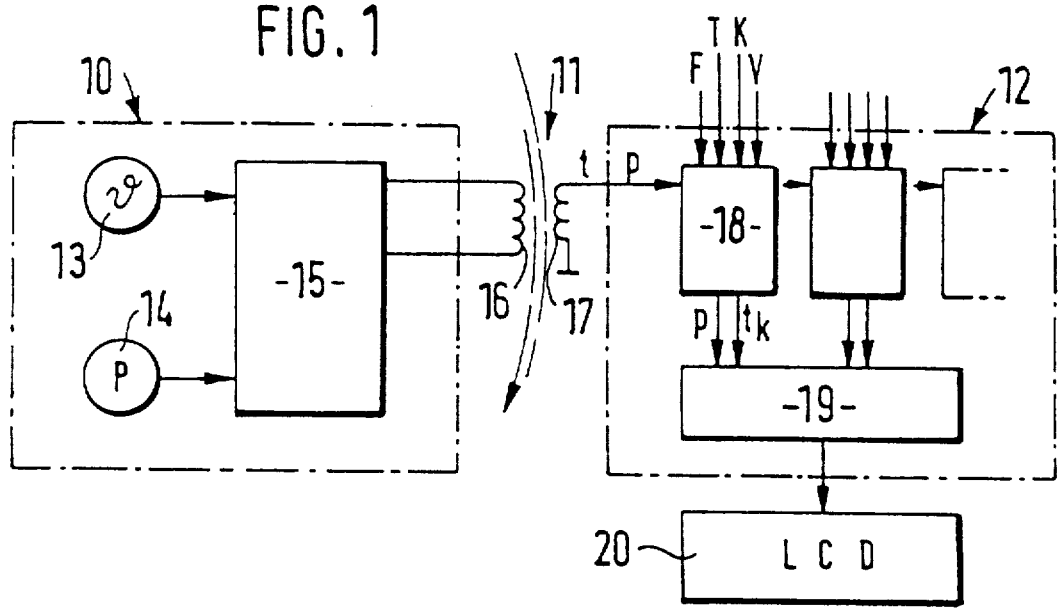
FIG. 1 shows a block wiring diagram of the circuit arrangement, according to the invention, for monitoring an air volume of vehicle tires.

FIG. 1 shows a block wiring diagram of the circuit arrangement, according to the invention, for monitoring the air volume in a vehicle tire by measuring the air pressure and the temperature at a wheel of a motor vehicle. It comprises a circuit part 10 rotatable with the wheel, a transmitter 11, and an evaluating circuit 12 which is fixed with respect to the vehicle. The rotating circuit part 10, which is preferably fastened at a wheel rim, contains a temperature sensor 13 and a pressure sensor 14 in the form of semiconductor sensors whose signals are fed to an electronic unit 15 for signal processing, the construction and operation of the electronic unit 15 being explained in more detail in WO 87/04123. The output of the electronic unit 15 is connected with a ring-shaped repeater coil 16 which rotates with the vehicle wheel and enables a transmission of data to a receiving coil 17 of the transmitter 11 regardless of the wheel position, the receiving coil 17 being arranged in the vicinity of the wheel so as to be fixed with respect to the vehicle. The receiving coil 17 is connected to ground at one end, and connected by the other end with an input of a correction circuit 18 in the evaluating circuit 12 which is fixed with respect to the vehicle. The temperature and pressure measurement values t, p which are measured by the temperature sensor 13 and the pressure sensor 14 and processed in the electronic unit 15 are fed cyclically via this input in time sequence. A plurality of correction parameters which serve for correcting the temperature value t measured by the temperature sensor 13 are applied to additional inputs of the correction circuit 18. A first, changeable correction parameter is the moisture of the tire. For this purpose, a capacitive moisture sensor is fastened at the vehicle in the vicinity of the wheel, which moisture sensor is sprayed by the tire when the roadway is wet. The signal of this moisture sensor is fed to the input F of the correction circuit 18 as O/I signal via a threshold value switch. A time constant by which the temperature correction during changes or jumps in temperature is plotted is fed to the input T. This time constant T is a value which is empirically determined with the standard utilized pairing of the wheel rim and tire. This value can possibly be linked with the moisture signal F to form a second time constant for temperature changes in wet tires. Correction values which are likewise determined for the pairing of rim and tire and which determine the temperature differences between the tire air and sensor temperature in wet and dry wheels at different tire pressure values are fed to another input K. Another correction parameter is defined by the vehicle speed with which it is determined whether the vehicle is stationary or running slowly, or at regular speed. A corresponding O/I signal is fed to the input v of the correction circuit 18. A corrected temperature value $t_k$ is emitted at the output of the correction circuit 18, wherein the correction is determined by the air pressure p in the tire as correction parameter and from the road moisture F, the time constant T specific to the wheel, and the vehicle speed. A corresponding correction circuit is provided for each of the vehicle wheels to be monitored in the circuit part 12 which is fixed with respect to the vehicle. The pressure values are divided by the respective corrected temperature values $t_k$ in a computer 19 of the evaluating circuit 12 in order to determine the air volume in the tire which is to be monitored.

The value determined cyclically for every wheel is compared with a previously inputted limiting value. When reaching or falling below the limiting value in one of the monitored tires a warning indication is effected via a display 20. The instantaneous tire pressure or the temperature of each tire can possibly also be indicated in a known manner via display which may be formed as LCD 20.

Figure 2:
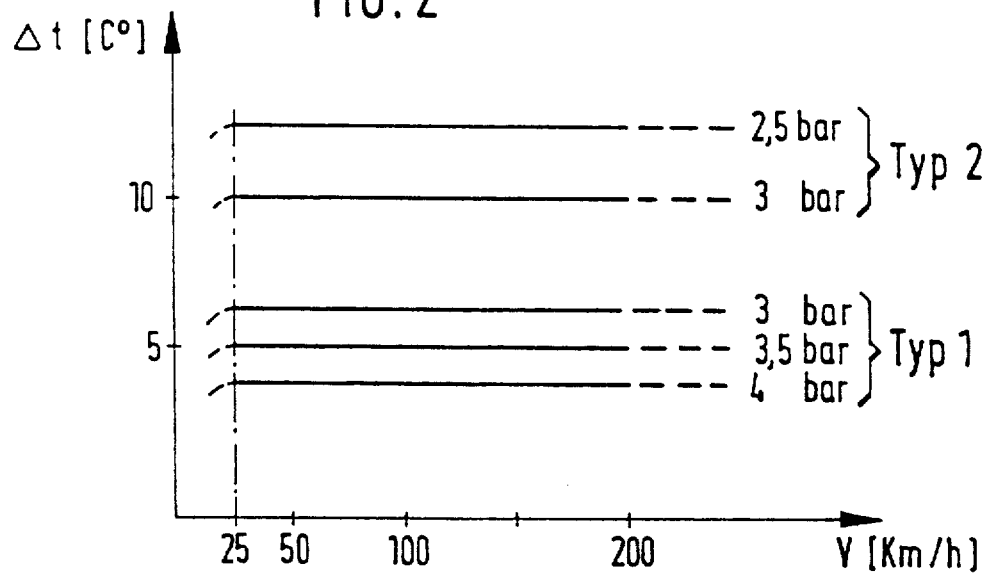
FIG. 2 shows a diagram with the measurement value error as a function of the vehicle speed.

FIG. 2 shows a diagram of a group of characteristic lines illustrating the temperature difference $\Delta t$ between the measurement value of the temperature sensor 13 and the actual temperature of the air in the tire at different tire pressures. It can be seen from this diagram that the temperature difference $\Delta t$ is greater as the tire pressure decreases and that it also depends on the vehicle type and the rim/tire combination of the vehicle wheels used in the latter. In addition, it can be seen from the diagram that the temperature difference $\Delta t$ remains practically constant above a determined vehicle speed, i.e. is not dependent on the vehicle speed. The group of curves shown in FIG. 2 was determined on the basis of test drives with two different vehicles, type 1 and type 2. It was determined, in addition, that the temperature difference $\Delta t$ remains unchanged above a speed of 25 km/h. On the other hand, for lower speeds down to standstill of the vehicle, the temperature difference is superimposed in addition by thermal time constants between the air in the tire and the sensor.

The group of curves, according to FIG. 2, was plotted on a dry roadway and indicates the temperature difference $\Delta t$ by which the actual temperature of the air in the tire is greater than the temperature measured by the temperature sensor 13. A corresponding group of curves results on a wet roadway, wherein, however, the temperature difference $\Delta t$ is smaller. The temperature differences are fed to the input K of the correction circuit 18 as fixed correction parameters typical of a vehicle.

Figure 3:
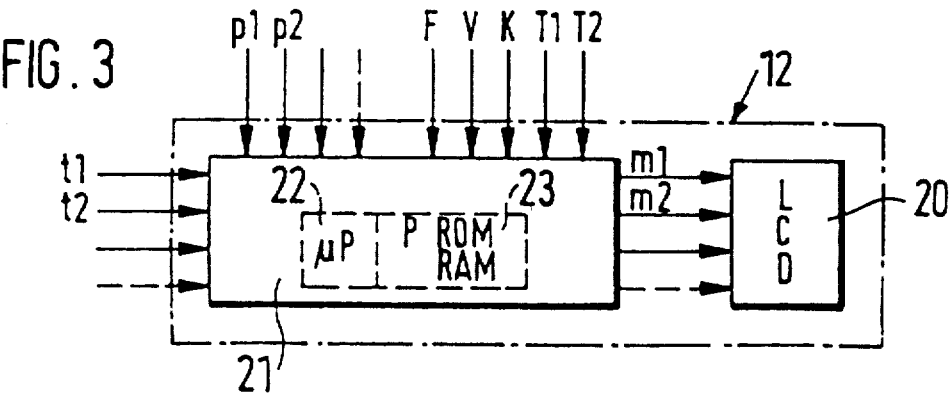
FIG. 3 shows a block wiring diagram of the correction circuit for a plurality of wheels of a vehicle.

FIG. 3 shows another embodiment of the correction circuit of evaluating circuit of FIG. 1, wherein all wheels of the vehicle which are to be monitored are connected to a mutual correction circuit 21. This correction circuit 21 contains a computer 22 and a data storage 23. The temperature values t1, t2, . . . measured by the temperature sensors 13 of the vehicle wheels to be monitored are fed to the correction circuit 21 via a plurality of inputs shown on the left-hand side. Moreover, the tire pressures p1, p2, . . . assigned to the individual temperature values are fed to it as variable parameters. A moisture signal F is fed via another input as variable parameter in that e.g. this signal is tapped from the switching positions of the windshield wiper system for continuous operation. A speed signal v, which is tapped e.g. from a switch which is closed when a predetermined speed of e.g. 50 km/h is exceeded, is fed to the correction circuit 21 as variable parameter via another input. A correction table K which is a function of the vehicle type or wheel type and corresponds to the group of curves for type 1 and type 2 from FIG. 2 is stored in the data storage 23 of the correction circuit 21 as fixed parameter via another input of the correction circuit when the wheel is wet or dry, respectively. It is likewise possible to store correction tables for various vehicle and wheel types in the correction circuit 21 already during the production and programming of the correction circuit 21 and then to input the respective vehicle and wheel type via the input K of the correction circuit 21 when putting the tire pressure monitoring circuit into operation. Finally, thermal time constants for speeds above and below the limiting value and for dry and wet roadways are fed in as fixed parameters via the inputs T1 and T2 of the correction circuit 21, which thermal time constants are likewise determined in relation to the specific vehicle or wheel. These time constants can also be stored already in the storage 23 of the correction circuit 21 for various types, so that the corresponding time constants can be retrieved from these values by inputting the vehicle or wheel type. The air volume m1, m2, . . . in the tire to be monitored is now calculated according to the equation $m = p/(t+\Delta t)$ with the program-controlled computer 22 of this correction circuit 21 in cyclical sequence from the measured temperature values t1, t2 . . . and the variable parameters p1, p2 . . . F, v and the fixed parameters K, T1, T2 for every vehicle wheel to be monitored. The temperature correction $\Delta t$ is a function of the air pressure p in the tire, the tire state "wet" or "dry", the driving speed, and the vehicle or wheel type. Depending on the programming of the computer 22, an overall parameter can be formed from the various parameters and accordingly the temperature correction $\Delta t$ can be taken from a correction table or different correction values are taken from the data storage for the different parameters and added to form the temperature correction Δt.

In the simplest case, a temperature differential value Δt determined by prior test drives of a vehicle or wheel type is added as fixed correction parameter when the vehicle is driven,, i.e. to the respective measured temperature value t1, t2 so as to be dependent on the variable parameter driven/stationary.

While the invention has been illustrated and described as embodied in a circuit arrangement for monitoring pressure and temperature of tires, it is not intended to be limited to the details shown, since various modifications and structural changes may be made without departing in any way from the spirit of the present invention.

Without further analysis, the foregoing will so fully reveal the gist of the preset invention that others can, by applying current knowledge, readily adapt it for various applications without omitting features that, from the standpoint of prior art, fairly constitute essential characteristics of the generaic or specific aspects of this invention.

What is claimed as new and desired to be protected by Letters Patent is set forth in the appended claims:

1. A circuit arrangement for monitoring air volume in a vehicle wheel tire, and circuit arrangement comprising sensor means rotatably fastened to the vehicle wheel for sensing air pressure and temperature in the tire and for generating respective signals; an evaluating circuit for generating a warning signal when the air volume in the tire falls below a predetermined value, and fixed with respect to the vehicle; electromagnetic transmitter means for transmitting the respective signals from said sensor means to said evaluating circuit, said evaluating circuit including a correction circuit connected with said electromagnetic transmitter means for receiving the respective signals and predetermined correction parameters and for outputting measurement values of the tire temperature and the tire air pressure in accordance with the correction parameters.

2. A circuit arrangement as set forth in claim 1, wherein the predetermined parameters comprise variable and fixed correction parameters, said correcting circuit including data storage means for storing the fixed correction parameters.

3. A circuit arrangement as set forth in claim 2, wherein the tire temperature measurement value is output in accordance with variable correction parameters that include tire pressure, speed-dependent parameters and a parameter characterizing a wet/cry condition of a road.

4. A circuit arrangement as set forth in claim 3, wherein the fixed parameters include a correction value characterizing one of specific vehicle and wheel, and thermal time constants.

5. A circuit arrangement as set forth in claim 4, wherein said correction circuit includes a program-controlled computer which cyclically determines the air volume to be monitored in the tire in accordance with the respective signals generated by said sensor means, and the correction parameters.

6. A circuit arrangement as set forth in claim 5, wherein the correction value characterizing one of specific vehicle and wheel is selected from a plurality of fixed correction parameters stored in said data storage means and characterizing a vehicle type and a wheel type.

7. A circuit arrangement as set forth in claim 7, wherein said correction parameters include a temperature differential value between the temperature measurement value during test drives and the tire temperature measurement value during regular driving of the vehicle.

* * * * *